United States Patent
Bitton

(10) Patent No.: US 7,362,654 B2
(45) Date of Patent: Apr. 22, 2008

(54) SYSTEM AND A METHOD FOR DETECTING THE DIRECTION OF ARRIVAL OF A SOUND SIGNAL

(75) Inventor: Charly Bitton, 147 Hadkalim St., Pardes Hana 37021 (IL)

(73) Assignee: Charly Bitton, Pardes Hana (IL)

( * ) Notice: Subject to any disclaimer, the term of this patent is extended or adjusted under 35 U.S.C. 154(b) by 39 days.

(21) Appl. No.: 11/135,454

(22) Filed: May 24, 2005

(65) Prior Publication Data

US 2006/0268663 A1    Nov. 30, 2006

(51) Int. Cl.
G01S 3/80 (2006.01)
(52) U.S. Cl. .................................................. 367/127
(58) Field of Classification Search .............. 367/127
See application file for complete search history.

(56) References Cited

U.S. PATENT DOCUMENTS

| | | | | |
|---|---|---|---|---|
| 4,857,912 A | * | 8/1989 | Everett et al. | 340/508 |
| 5,586,086 A | * | 12/1996 | Permuy et al. | 367/127 |
| 5,784,339 A | * | 7/1998 | Woodsum et al. | 367/134 |
| 6,185,153 B1 | * | 2/2001 | Hynes et al. | 367/124 |
| 6,707,910 B1 | * | 3/2004 | Valve et al. | 379/388.06 |
| 2005/0008169 A1 | * | 1/2005 | Muren et al. | 381/92 |

OTHER PUBLICATIONS

Godara; Limitations and Capabilities of Directions-of-Arrival Estimation Techniques using an Array of Antennas: A Mobile Perspective; 1996; IEEE; pp. 327-333.*

* cited by examiner

*Primary Examiner*—Dan Pihulic
(74) *Attorney, Agent, or Firm*—Martin Fleit; Paul D. Bianco; Fleit Kain Gibbons Gutman Bongini & Bianco P.L.

(57) ABSTRACT

The disclosed invention is a highly reliable cost effective sound direction detection system. In the preferred embodiment of the invention the system comprises a device which includes two microphones set at a spread of at lease 5 cm from each other, a digital signal processing (DSP) and a command processing board. A pattern recognition algorithm allows the system to recognize the signal of an actual event and distinguish it from echoes and reflections according to several parameters such as the signal's time of arrival, energy, amplitude levels and frequency. The pattern of the recorded signals is analyzed according to prevalent signal patterns and then the real event can be identified. By identifying the signal of the sound event and distinguishing it from background noises and from its reflections, the system can calculate its direction of arrival (DOA) using classical sound direction detection methods.

9 Claims, 2 Drawing Sheets

SYSTEM AND A METHOD FOR DETECTING THE DIRECTION OF ARRIVAL OF A SOUND SIGNAL

BACKGROUND OF THE INVENTION

The present invention relates to the field of sound direction detection.

The need to detect the exact direction of arrival (DOA) of a sound is highly important in a variety of fields. Detecting the direction of the sound emitted by a shooting firearm, for instance, might be crucial both for military and civic situations. Due to the changing nature of armed conflicts and the increase in attacks by guerillas, armed civil conflicts, and of humanitarian action given in unstable regions, receiving accurate and reliable data about the position of a shooter may allow damage reduction by enabling the appropriate responses. U.S. Pat. No. 5,586,086 provides a means for locating a firearm on the basis of acoustic detection. The disclosed method and system detect the location of a firearm firing projectiles by using an acoustic detection antenna that includes at least three microphones spaced apart from one another to detect and record signals and time offsets of the signals which are representative of the muzzle noise of the firearm and/or the sound wave emitted by the mach cone generated by a projectile that has supersonic muzzle velocity, and processing the signals and their time offsets in such a manner as to determine at least the direction in which the firearm is located.

U.S. Pat. No. 6,185,153 is a system for detecting gunshots, which includes an input device including a microphone for converting acoustic noises into signals and amplifiers for amplifying the input signals, a threshold detector for receiving the amplified signals and comparing the signals with a predetermined threshold value and for producing an output signal when the threshold value is exceeded. A pulse width detector is connected to the threshold detector for producing an output signal only if the width of the threshold detector output signal is within a predetermined range of values. A pulse count detector is also connected to the threshold detector for producing an output signal when the level of the threshold output signal is above a peak threshold level or the number of threshold level output signals that exceed a threshold level are less than a preset limit. An output device indicates that a gunshot has occurred only when signals are received from the pulse width detector and the pulse count detector during a sampling period.

Another field in which sound direction detection is important is in the field of security systems which include surveillance cameras. The limited angle of view of security cameras often dictates making use of several cameras in order to provide a full visual coverage of a given area. This solution increases the complexity and cost of such systems. One traditional means for overcoming this problem includes regularly rotating the direction of the camera, but this solution might cause the camera to be directed in the wrong direction in critical moments. The integration of a sound direction detection system into such systems helps overcome this limitation and to make them more efficient and reliable.

Security systems that do implement such methods integrate other methods of directional detection as described in U.S. Pat. No. 4,857,912. This system utilizes multiple sensors for detecting intrusion into an area. Each of the sensors operates on a different principle to detect intrusion. Sound, vibration, infra-red, motion detection, microwave and light level sensors are used, for example, which obviously makes it a highly complex and costly solution.

There is therefore a need for a simple and highly reliable system and method for detecting the direction of an emitted sound which can be adjusted to suit the different needs of different systems. The solution should also be able to supersonic as well as sonic sounds and be compact and lightweight enough to be carried by a person.

SUMMARY

The present invention discloses an apparatus for automatically the detecting direction of sound events. The apparatus comprised of at least four sound detectors positioned in the vicinity of the device; signal pattern recognition means for identifying the real event's signal; processing and analyzing means for detecting direction of arrival of sound events in accordance with signal pattern identification. The sounds detectors are positioned at a maximum spread within the physical boundaries of the device.

The detection of sound direction is based on first signal event detection technique. The sound level is determined according to the sampled signal's frequency and energy level. The detection of the first signal event is based on a pattern identification criterion by estimating the envelope of the sounds signal energy. The processing and analyzing means include analyzing the signals' differential arrival time as sampled by the different microphones. The estimation of time of arrival differences between the sound detectors may be computed according to frequency properties.

Also within the scope of the present invention is a video camera and means for turning the video camera towards the detected direction.

The present invention also discloses a method for automatically detecting the direction of noise events. The method is comprised of the following steps: sampling sound signals from at least four different sources in space; applying pattern recognition techniques for identifying the signal's first event; processing and analyzing all signals for detecting direction of arrival of sound events based on pattern recognition results.

The detection of direction of arrival is based on first signal event detection technique. The first signal event detection is based on a floating threshold criterion by estimating the sounds signal energy envelope. The estimation of time of arrival differences between the sound detectors may be computed according to frequency properties. The disclosed method may also include the step of turning a surveillance camera in the direction of the detected event.

DETAILED DESCRIPTION OF THE PREFERRED EMBODIMENT

Figure 1:
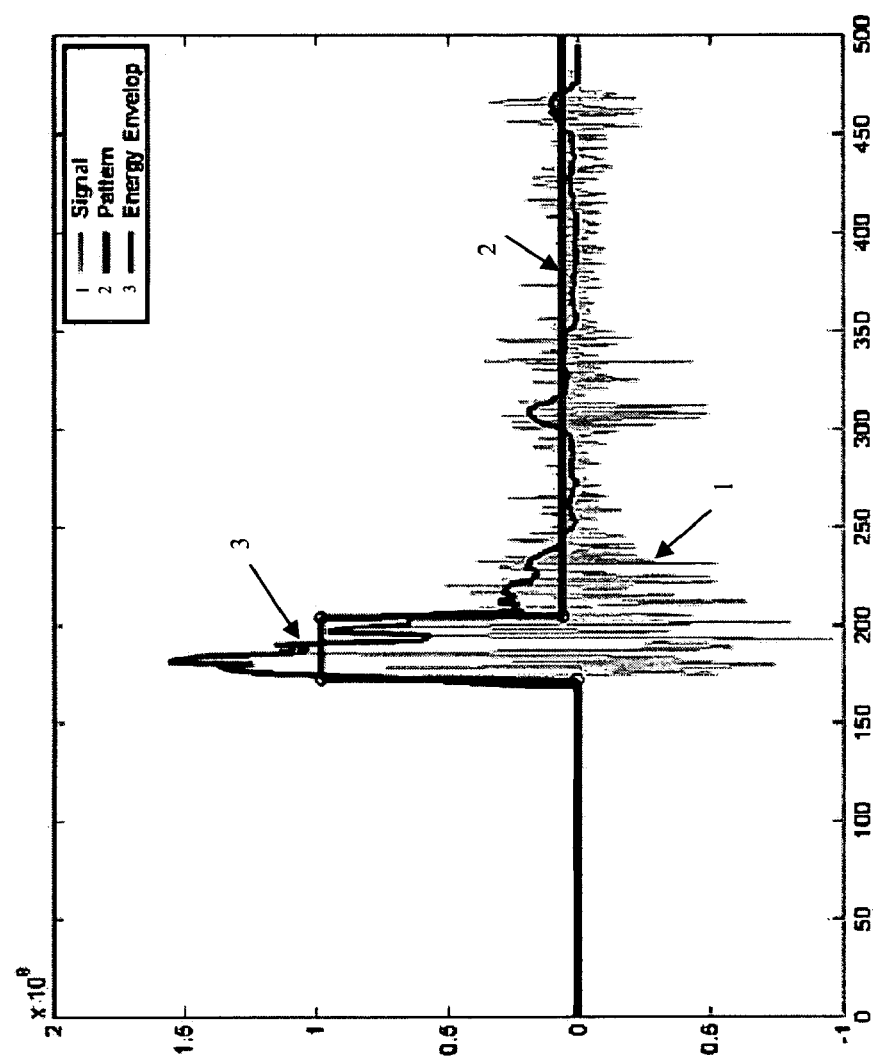
FIG. 1 illustrates the DOA first event detector algorithm graph.

The present invention is a highly reliable sound direction detection system. It is an optimal solution for detecting the direction of an abrupt sound source in wide variety of spaces which are not necessarily sterile. When an event which produces a loud noise occurs, such as a shout or a gun shot, it can be detected by the said invention, even in a noisy and crowded area.

The estimation of the DOA of a known signal is a central problem in many fields including radar, sonar, and communication. The problem is to find the best estimation of the source of a transmitted signal. In classical DOA estimations, one calculates the multiple reflections having different DOAs of the reflected signal. This is a multi dimensional complex algorithm that requires heavy resources depending on the number of reflections and microphones.

The method described in the present invention eliminates the need for complex calculation abilities by identifying the sound emanating from the actual sound source event, the "real" signal, then calculating the direction using the classical method for one source. This significantly reduces the complexity of the calculation, while maintaining a high direction resolution.

The main problem in determining the direction of an incoming sound signal derives from the fact that in most cases the signal is composed of multiple reflections each coming from a different direction and with a different time delay. This is especially true for sound signals in urban spaces. A sound which is caused by an event happening in one location bounces off all walls and surfaces in the vicinity and is received by the sensors as a multiplicity of sounds coming from different directions with different time delays. Some of these sound signal reflections may overlap in time. In such cases the conventional techniques of determining the direction of a sound source become ineffective and/or demand extensive processing resources, mainly because of the crucial need to correctly estimate the exact number of sources. New estimation techniques that are designed to easily handle overlapping reflections are therefore required. These new techniques also have to perform efficiently and overcome continuous static background noises.

The preferred embodiment of this invention makes use of such a technique. The device is comprised of four microphones, a digital signal processing (DSP) and a command processing board. The microphones are set at a spread of at lease 5 cm from each other. This spread creates the differential time of arrival of the sound to the different microphones, according to the relative location of the sound source and the device, which is necessary for the calculation of the direction. The processing board executes the direction of arrival (DOA) calculation algorithm, translates its results into directional output. This output may come in the form of a graphical and textual display, informing the user about the direction of the sound source, or in the form of commands, changing the point of view (POV) of a camera to the appropriate direction.

In order to determine with a high level of certainty the DOA of a sound signal the system continuously samples and processes a plurality of digitized inputs samples received from the physical layer (PHY) module. This data stream is a sequence of samples of a plurality of analog signals taken each at a sample frequency. These samples, which are records of the same event taken by different sources, are processed in order to determine the beginning of an event. For example, a floating threshold criterion, which is also noise resistant, may be used to estimate the envelope of the energy signals in order to determine the beginning of the event using a pattern recognition algorithm. The graph of such algorithm is displayed in FIG. 1.

The pattern recognition algorithm allows the system to recognize the signal of an actual event and distinguish it from echoes and reflections. The first event is not easily recognized since in different circumstances reflection signals might be detected by the microphones before the signal of the first event reaches it. The purpose of pattern recognition algorithm is therefore to identify the first event according to several parameters whereas the time parameter is only one of them. Other parameters may include the signal's energy and amplitude levels and its frequency. The pattern of the recorded signals is analyzed according to prevalent signal patterns and then the real event can be identified. Once the beginning point of an event is known, the DOA calculation of a single source can be performed using standard methods by comparing the time delay which can be calculated with a simple maximum likelihood estimator of that event in the four microphones and using a simple trigonometric calculation for finding the direction.

FIG. 1 illustrates an exemplary case of 4 samples, $x_j=(a_j, m_j)$, $j=1,2,3,4$ marked with O. $a_j$ stands for the position on the time axis (X) and $m_j$ stands for the value of the sample (Y).

Line 1 in the graph is the sampled signal x(t). Line 3 is the calculated envelope of the energy of the sampled signal. Line 2 represents the threshold signal and is calculated based on the energy envelope. The noise threshold determines the beginning of the event.

Figure 2:
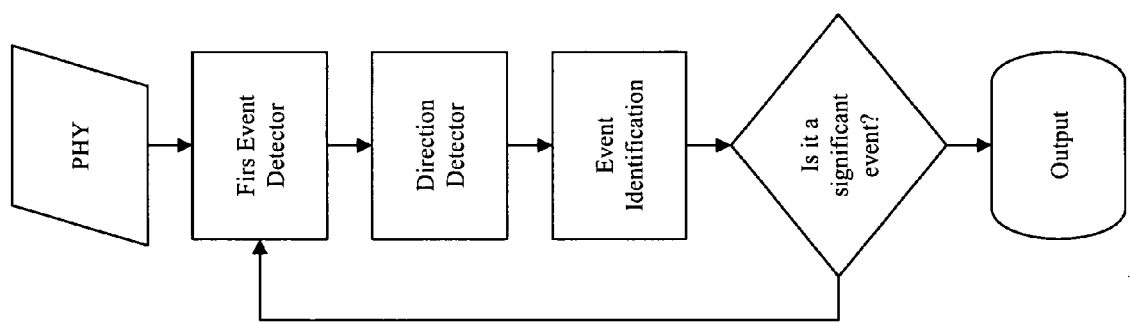
FIG. 2 is a flowchart illustrating the DOA sequence of operations.

FIG. 2 is a flowchart of the sequence of operations. First, sound signals are sampled by the PHY module. For each sample the beginning of the event is calculated, the direction is determined by comparing data from the four microphones and the nature of the event is analyzed. The system then determines whether it is a significant event according to predefined parameters such as the level of energy and frequency of the signal. If the event is significant, its data is transferred to the appropriate output format. In the case of devices which inform the user about the location of the sound source, graphical and textual data are displayed on a user interface display. When the device controls the POV of a camera the motors which control the camera are given a command to turn it in the appropriate direction. In addition, the output may be used for any other type of devices or a combination thereof.

The preferred embodiment is based on an algorithm which uses four microphones (marked in the following description as $P_1$, $P_2$, $P_3$, $P_4$). The input samples form microphone $P_i$ are marked as $x_1^i, x_2^i, x_3^i, \ldots x_n^i$. The time of arrival of each sample to each of the microphones $P_1$, $P_2$, $P_3$, $P_4$ is calculated. Let us assume that the input sample rate is 1/T. Let $x^i(t)$ be a continuous function such that, $x^i(m \cdot T) = x_m^i$ (for all $1 \leq m \leq n$). $x^i(t)$ is the input signal from microphone $P_i$.

The algorithm is comprised of two parts: computation of the a coarse time of arrival $t_i$ (first event) of the received signal for each microphone; A algorithm for estimating the exact difference in the time of arrival ($d^i_1, d^i_2, d^i_3$) for each of the microphones ($P_i$) in comparison to the other microphones ($P_j$, $j \neq i$), i is chosen to give a maximum signal to noise ratio (SNR), according to some criterion; translation of the time differences $d^i_1, d^i_2, d^i_3$ (i is chosen with the maximal SNR value) to an accordant position in space.

In order to calculate the time of arrival $t_i$ of the transmitted signal for microphone $P_i$ the energetic structure of the transmitted signal is assumed to be a continuous function $f$, which is piecewise linear function, combining 6 points:

$$x_j=(a_j, m_j), j=0 \ldots 5.:$$

$$f(t) = \begin{cases} m_0 & t \leq a_0 \\ t \cdot \alpha_i + \beta_i & a_i \leq t \leq a_{i+1} (0 \leq i < 5) \\ m_5 & t > a_5 \end{cases}$$

Where $\alpha_i$, $\beta_i$ are unknown, calculated under the constrain that $f$ is continuous and $f(a_i)=m_i$.

This implies, for example that $m_0=a_1\square\alpha_1+\beta_1\cdot\alpha_i$, $\beta_i$ can be completely determined from the above constrain, as a function of $a_j, m_j$ (j=0, ..., 5).

Let $P_i(t)$ be the energy envelope of the input signal from microphone $P_i$. Our Algorithm minimizes the following expression $$e(a_0 \ldots, a_5, m_0 \ldots m_5)=\int \{P_i(t)-f(t)\}^2 dt$$

Standard least square calculation is used to find the appropriate $a_0, \ldots, a_5, m_0, \ldots, m_5$ that minimize the last expression.

Now in order to find $t_i$, one can apply threshold criteria such as $m_1/m_0>Thd_0$ and $m_2/m_0>Thd_1$ where $Thd_0$, $Thd_1$ are some threshold numbers. Then we define $t_i=a_1$. We can also find an interval $L=a_2-a_0$ where we can assume that no other real event lies between $a_0$ and $a_2$. The last step is finding the exact time delay between for this event. This is a standard problem for a single source DAO calculation, for example a Maximum Likelihood solution can be found in the classical literature. The finale DOA can be found by translating (using simple trigonometry) the time delay into a DOA.

This calculation is based on the assumption that no reflections occur during the interval L. To insure this assumption the device needs to be installed so that no reflectors (such as a wall) are positioned in a distance greater than 0.5 meter from it.

The uniqueness of this algorithm lays in the fact that the signals are calculated according to their time attribute whereas prior art usually performs the calculation according to their frequency. This manner of computation is much more accurate, especially when a small number of samples are involved and the frequency axis becomes problematic and unreliable.

What is claimed is:

1. An apparatus for automatically detecting the direction of noisy sound events, said apparatus comprised of:
   at least two sound detectors positioned in the vicinity of the apparatus, wherein each said sound detector receives a signal comprising a first event and multiple reflections;
   means for estimating the envelope of each said received signal;
   means for identifying the beginning of the first event of each said signal;
   processing and analyzing means for detecting the direction of arrival of said noisy sound events, wherein said processing and analyzing means applies maximum likelihood methods on intervals of the signals wherein said intervals start with the beginning of the first event and end after a predetermined time in which no reflection has yet occurred.

2. The apparatus of claim 1 wherein the sounds detectors are positioned at a maximum spread within the physical boundaries of the apparatus device.

3. The apparatus of claim 1 wherein a piecewise linear function is extracted from said signal's envelope using standard least square calculation, and wherein the beginning of the first event is determined according to the parameters of the said piecewise linear function.

4. The apparatus of claim 1 wherein the processing and analyzing means comprises analyzing the time delay between each two signal received, wherein said analysis concentrates on the intervals that start with the beginning of the first event and end after a predetermined time wherein no reflection has yet occurred.

5. The apparatus of claim 1 further comprising a video camera and means for pointing the video camera means in accordance with the detected direction.

6. A method for automatically detecting the direction of noisy events, said method comprising the steps of:
   sampling sound signals from at least two different sources in space;
   estimating each said signal's envelope;
   identifying each signal's first event;
   detecting the direction of arrival of sound events based on maximum likelihood by analyzing the time delay between each two signal received, wherein said analysis concentrates on the intervals that start with the beginning of the first event and end after a predetermined time wherein no reflection has yet occurred.

7. The method of claim 6 wherein each signal's envelope is estimated according to at least on of the following parameters: the sampled signal's frequency, the sampled signal's and energy level, the sampled signal's amplitude.

8. The method of claim 6 wherein a piecewise linear function is extracted from said signal's envelope using standard least square calculation, and wherein the beginning of the first event is determined according to the parameters of the said piecewise linear function.

9. The method of claim 6 further comprising the step of turning a surveillance camera in the direction of detected event.

* * * * *